Aug. 3, 1943. L. G. ARPIN Re. 22,358

METHOD OF PRODUCING BEADS

Original Filed Aug. 3, 1940

INVENTOR.
LEONARD G. ARPIN
BY Samuel Stephen Salter
ATTORNEY.

Reissued Aug. 3, 1943

Re. 22,358

UNITED STATES PATENT OFFICE 22,358

METHOD OF PRODUCING BEADS

Leonard G. Arpin, Montclair, N. J.

Original No. 2,231,556, dated February 11, 1941, Serial No. 350,550, August 3, 1940. Application for reissue April 16, 1941, Serial No. 388,875

5 Claims. (Cl. 18—47.5)

My invention relates to the manufacture of spherical articles such as beads and marbles of all types.

Formerly such articles were generally made of glass, but in recent years the trend toward the use of plastic materials has become marked. Plastics, such as cellulose acetate, thermosetting plastic materials or similar materials are suitable, the qualities of these plastics being well known in the art.

I am aware of a method of making beads in which plastic material is cast or extruded in the form of a rod, the diameter of which approximates the diameter of the finished bead. The rod is then maintained between grinding elements, which by means of semi-circular grooves, grind the rod so that a ball is formed for each groove on the grinder element. It is apparent that a great deal of material must be wasted in this grinding process, viz., the material between the areas required to form the balls. Furthermore, each ball must be drilled to provide the usual bead hole and this operation adds appreciably to the cost of manufacture.

Bearing the foregoing in mind, it is an object of the present invention to produce beads which, although ground, are accompanied by an insignificant waste of material in their manufacture.

It is also an object of this invention to eliminate the step of drilling holes in such beads and in addition produce a bead having a smoother and more symmetrical hole than produced by the grinding and drilling method above noted.

Another object of my invention is to produce beads or marbles in such a manner as to prolong the life of the grinding elements, this feature being attributable to the reduced amount of grinding required in the process.

Other objects of my invention will be apparent from the following description, it being understood that the above general statements of the objects of my invention are intended to explain and not to limit it in any manner.

Referring to the drawing.

Figure 1:
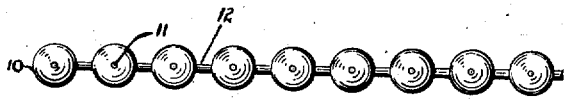
Fig. 1 is a plan view of a chain of balls as cast in the molding machine.

Referring to Fig. 1, the chain of balls comprises individual balls 10, having transverse holes 11 formed therein and connected to each other by gates 12. The chain of balls is molded of plastic material and is of course a positive replica of the mold which produces it. As one skilled in the art will easily recognize, the holes 11 are formed by suitable pins in the die which produced the chain.

The molding of the chain is accompanied by the usual weld line which appears on the balls where the dies met and this constitutes a surface imperfection. The balls therefor are formed slightly oversize to provide a tolerance whose removal carries with it this objectionable weld line. It is essential for the succeeding operation that the gates be of exact length and that the balls be spaced exactly at the correct distance apart.

Figure 2:
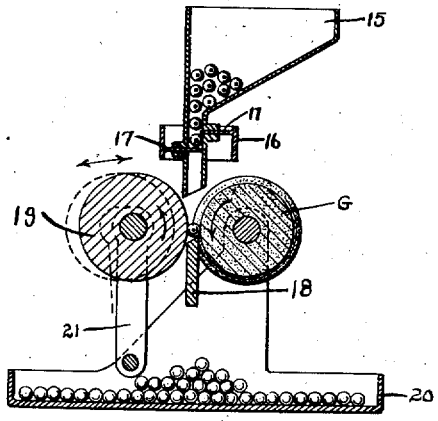
Fig. 2 is a schematic view of a grinding machine for grinding the chain of balls shown in Fig. 1.

This correct distance is determined by the grooves 13 and ridges 14 formed on the grinding roller G of the grinding machine shown schematically in Fig. 2.

The construction of the grinding machine will be apparent to those skilled in the art and will be briefly described:

The molded chains of balls are placed in the hopper 15 and individual chains find their way into the outlet which is controlled by the feeder mechanism 16. This feeder mechanism is slidably arranged on the hopper outlet and the shelves 17, by periodical reciprocatory motion, release the chains individually, whereupon they fall on and are supported by the anvil 18.

The grinder elements comprise the grinder roller G and the pressure roller 19. The roller 19 is pivotally supported on the bin 20 and pivotal motion is lent thereto by any suitable mechanism, the roller 19 swinging outwardly with the link 21 to permit a chain of balls to be deposited on the anvil 18. A spring, not shown, causes the roller 19 to bear against and urge the chain against the roller G which only rotates and is not swung out of position.

The rollers rotate in opposite directions but the roller 19 is decidedly slower than the roller G.

Figure 3:
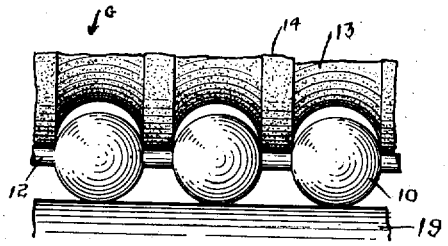
Fig. 3 is an enlarged view illustrating the action of the grinder rolls on the chain of balls.
Figure 4:
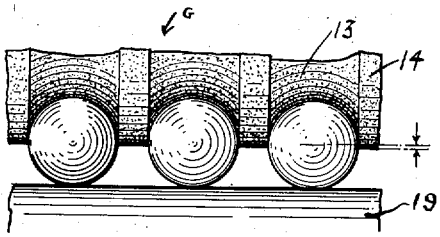
Fig. 4 is an enlarged view illustrating the formation of the individual beads.

A chain of balls being released by the feeder mechanism 16, it falls into position on the anvil 18, where, if necessary, it may be manually directed so that the balls 10 are mated with the grooves 13 as seen in Fig. 3. The roller 19 thereupon swings inwardly and urges the chain against the roller G. The ridges 14 of the roller G are formed so that they extend slightly over the center line of the ball 10 as indicated by the arrows in Fig. 4. These ridges effectively grind away the gates 12, and the grooves 13, being of the exact dimensions required, clear away the tolerance provided, removing therewith the weld line formed by the dies. Perfect and symmetrical beads are thereby formed which fall into the bin 20 when the roller 19 again swings outwardly.

While the beads are formed with very little waste of material and without requiring the drilling of holes, they are actually far superior to beads as formed from rods and drilled, because the drilling operation chips the bead and the bead hole is often rough and sharp.

A bead formed according to the instant invention, however, has a ground periphery which makes the surface perfectly smooth and a molded bead hole which avoids sharpness and roughness. The finished bead bears distinct evidence of its manufacture in this regard.

The grinding roller G is of Carborundum or similar material of a fineness that the particular finish requires.

The grooves 13 of the grinder roller G must be of exact size and the reduced amount of grinding inherent in my method conserves and prolongs the life of the grinder roller.

It is essential in my process that the ridges 14 of grinder roller G and the gates 12 be identical in length, and that the grooves 13 are maintained spaced so as to mate exactly with the balls 10.

I have shown a preferred embodiment of my invention but it is obvious that numerous changes and omissions may be made without departing from its spirit.

I claim:

1. A method of making spherical articles which comprises casting a chain of balls connected in alignment and thereafter grinding said chain to remove said connections.

2. A method of making spherical articles which comprises casting a chain of balls connected to each other by gates, said gates being operative to space said balls from each other in exact and predetermined relationship and thereafter grinding said chain by a grinder having grinding elements fitting said cast chain whereby said gates are removed and said balls ground to exact shape.

3. A method of making beads which comprises molding a chain of balls connected to each other by gates, each ball having a bead hole formed therethrough by said mold and thereafter applying said chain to a grinder for removing said gates and reducing said beads to exact shape.

4. A method of making beads which comprises molding a chain of aligned and uniformly spaced balls connected to each other by uniform gates, each of said balls being slightly oversized to provide a working tolerance and having bead holes formed therethrough transverse to the axis of said chain, and thereafter grinding said chain of balls by a grinder having uniform grooves spaced according to said balls, the grinding spaces thereof corresponding to said gates, said grooves of said grinder reducing said balls to exact diameter and removing surface imperfections and the grinding spaces between said grooves removing said gates, whereby separate beads are produced.

5. A method of making beads which comprises molding an elongated member having a series of spaced bead holes formed transversely thereof by said mold and applying said elongated member to a grinder for separating said elongated member into individual beads, each of said beads having one of said bead holes formed diametrically therethrough.

LEONARD G. ARPIN.